United States Patent
Eynon et al.

(10) Patent No.: US 6,830,288 B2
(45) Date of Patent: Dec. 14, 2004

(54) COWL ASSEMBLY WITH SNAP-ON SEALS

(75) Inventors: Stephen James Eynon, Auburn Hills, MI (US); Edwin Eugene Clapham, Livonia, MI (US); Mathew Theodore Murto, Dryden, MI (US); John Carl Gall, Leonard, MI (US)

(73) Assignee: Collins & Aikman Automotive Company Inc., Troy, MI (US)

( * ) Notice: Subject to any disclaimer, the term of this patent is extended or adjusted under 35 U.S.C. 154(b) by 0 days.

(21) Appl. No.: 10/402,638

(22) Filed: Mar. 28, 2003

(65) Prior Publication Data

US 2004/0124669 A1 Jul. 1, 2004

Related U.S. Application Data

(60) Provisional application No. 60/436,912, filed on Dec. 27, 2002.

(51) Int. Cl.[7] .............................................. B62D 25/08
(52) U.S. Cl. ...................................................... 296/192
(58) Field of Search .............................. 296/192, 203.2, 296/193.11; 15/250.001

(56) References Cited

U.S. PATENT DOCUMENTS

| | | | | |
|---|---|---|---|---|
| 3,843,194 A | * | 10/1974 | Yamada ........................ | 296/192 |
| 4,679,845 A | | 7/1987 | Detampel et al. ............ | 296/192 |
| 4,765,672 A | | 8/1988 | Weaver ...................... | 296/84 R |
| 4,909,566 A | * | 3/1990 | Hashimoto et al. ........... | 296/192 |
| 4,930,790 A | | 6/1990 | Sheridan ....................... | 277/12 |
| 4,943,102 A | * | 7/1990 | Hamamoto et al. ........ | 296/96.21 |
| 5,108,146 A | | 4/1992 | Sheppard ..................... | 296/192 |
| 5,149,169 A | | 9/1992 | Nozaki ....................... | 296/206 |
| 5,251,954 A | | 10/1993 | Vande Kopple et al. .... | 296/192 |
| 5,273,341 A | | 12/1993 | Cornille, Jr. ................ | 296/194 |
| 5,452,935 A | | 9/1995 | Mascia ........................ | 296/136 |
| 5,553,912 A | * | 9/1996 | Kubina et al. .............. | 296/192 |
| 5,692,953 A | * | 12/1997 | Bell et al. ................... | 454/146 |
| 6,193,304 B1 | * | 2/2001 | Takahashi et al. .......... | 296/192 |
| 6,213,541 B1 | | 4/2001 | Razgunas et al. ........... | 296/192 |
| 6,565,148 B1 | * | 5/2003 | Teramoto et al. ........... | 296/192 |
| 6,682,131 B2 | * | 1/2004 | Hayashi ..................... | 296/192 |

* cited by examiner

*Primary Examiner*—Stephen Gordon
(74) *Attorney, Agent, or Firm*—Grossman, Tucker, Perrault & Pfleger, PLLC

(57) ABSTRACT

A vehicle body ventilation system for a vehicle having a windshield, a hood, and a cowl assembly, wherein the cowl assembly comprises a cowl grille panel having a front and a rear edge and a first seal including a sealing portion and a carrier portion wherein the carrier portion is frictionally engaged with the front edge of the cowl grille panel. A second seal is provided that includes a sealing portion and a carrier portion wherein the carrier portion is frictionally engaged with the rear edge of the cowl grille panel. The carrier portion of the first seal and the second seal are of a first durometer and the sealing portion of the first seal and the sealing portion of the second seal each are of a second durometer for sealing to a vehicle windshield and hood, wherein the second durometer is less than the first durometer.

17 Claims, 7 Drawing Sheets

COWL ASSEMBLY WITH SNAP-ON SEALS

CROSS REFERENCE TO RELATED APPLICATIONS

This application claims priority to U.S. Provisional Application No. 60/436,912 filed Dec. 27, 2002.

FIELD OF THE INVENTION

This invention relates to vehicle ventilation systems and more particularly to cowl assemblies that provide an inlet to the HVAC system of a vehicle and more particularly to snap-on seals which may be attached to the front and rear edges of the cowl grille panel to seal it against the vehicle windshield, hood or plenum chamber.

BACKGROUND OF THE INVENTION

Cowl assemblies for vehicles are located between the hood, windshield and fenders to close out that area and act as a grille to cover the air inlet plenum that feeds air to the HVAC system of the vehicle. The cowl grille panel is usually injection molded of plastic and sits above the air plenum for the HVAC system. The cowl grille panel seals off against the vehicle windshield at the rear edge of the grille panel to prevent water leakage. Normally, a separate seal is used between the vehicle hood and a vehicle cross-member to prevent noise and fumes from the engine from entering the passenger compartment.

Various types of seals have been used in the past on cowl panels, often made of elastomeric or plastic materials, which are adhesively or mechanically attached to the cowl panel. This type of attachment represents a labor intensive assembly process and, over time, the adhesive used can age and lose it bond to the cowl panel.

U.S. Pat. No. 5,108,146 to Jonathan L. Sheppard discloses a cowl grille to windshield lip seal, the seal including a U-shaped portion and a lip portion with the inner surface of the U-shaped portion of the seal formed as to be complementary in shape and snap about the outer surface of the grille rear edge. Further, the lip seal comprises a dual durometer elastomeric material with the seal body (U-shaped) portion being harder than the lip portion. The rear edge portion of the cowl grille panel is molded in a much thinner cross-section than the body of the cowl grille panel, thus requiring significantly higher injection molded machine tonnage (clamp) forces to fill out the thin section of the cowl grille panel.

U.S. Pat. No. 5,251,954 to Kopple, et al. discloses a vehicle cowling which includes a seal which is integrally molded to the cowl body in a dual injection molding process wherein the mold cavity is first filled with a thermoplastic, such as 20% glass filled polypropylene. A slide core is first protracted in the mold cavity and after the fist shot of plastic, the slide core is retracted to form a space for a second shot of thermoplastic rubber (TPR) to form the integral seal. The seal of TPR, being softer than the cowl body, conforms to the shape of the windshield.

U.S. Pat. No. 6,213,541 to Razgunas, et al. assigned to the assignee of the present invention, and included herein by reference, discloses a two piece cowl assembly for a vehicle in which the two cowl parts have an edge segment and a seal member carried by said edge segment which has a sealing flap therein configured to seal against the outer surface of a windshield. The seal member has a hard and soft end, the hard end being connected to the cowl edge. The elastomeric seal is a co-extruded seal having a base of a semi-rigid strip of polypropylene and a lip that is configured as a flap having greater flexibility or elasticity than the semi-rigid base strip. As in the '146 patent, the cowl grille panel edge is much thinner than the body of the cowl grille panel, requiring additional clamp tonnage for the injection molding machine. Further, the fit of the seal to the cowl edge, while including complementary features between the cowl grille rear edge and the inner surface of the seal body, is desired to be loose such that the seal can slip along the edge of the two cowl grille parts to allow for lateral adjustment of the cowl grille parts relative to the seal.

U.S. Pat. No. 5,273,341, assigned to Ford Motor Co., discloses a sealing apparatus for providing a seal between the hood and the vehicle body structure. The rear edge of the vehicle hood includes a seal engaging member which engages an elastomeric strip which is located on a cross-rail member when the hood is closed.

What is therefore needed is a cowl assembly which includes seals such as snap-on seals for both the front and rear edges of a cowl grille panel, the seals being easily, yet securely installed. The snap-on seals should conform to the windshield to prevent water leakage and conform to the vehicle hood and/or plenum chambers to prevent both water and air leakage.

It is thus an object of this invention to provide snap-on seals for both the front and rear edges of a cowl grille panel to optimize assembly and performance.

It is further object to provide snap-on seals for a cowl grille panel which reduces the clamp tonnage required for the molding machine that molds the cowl grille panel.

It is a still further object of the present invention to provide a co-extruded seal having a rigid plastic carrier portion for secure retention of the seal to the cowl grille edge and a softer sealing portion to conform to opposing surface such as a vehicle hood, windshield or plenum, and which requires no additional fastening mechanism such as double-backed adhesive or mechanical fasteners.

It is still further object of the present invention to provide sealing shapes for the softer portion of the co-extruded seal which can compensate for uneven surfaces or loose fits of adjacent components.

It is still further object of the present invention to provide a cross-locking feature between the seal carrier portion and the cowl grille edge to increase pull-off forces of the mating parts and improve seal retention.

It is still further object of the present invention to provide a lip seal having an improved opposing moment which insures sealing against the opposing surface.

SUMMARY OF THE INVENTION

In a first embodiment the present invention is directed at a vehicle body ventilation system for a vehicle having a windshield, a hood, and a cowl assembly, wherein the cowl assembly comprises a cowl grille panel having a front and a rear edge, a first seal including a sealing portion and a carrier portion wherein said carrier portion is frictionally engaged with said front edge of said, cowl grille panel. A second seal is provided including a sealing portion and a carrier portion wherein said carrier portion is frictionally engaged with said rear edge of said cowl grille panel, wherein the carrier portion of said first seal and said second seal is of a first durometer and said sealing portion of said first seal and said sealing portion of said second seal each are of a second durometer, wherein said sealing portion of said first seal seals against a vehicle hood and said sealing portion of said second seal seals against a vehicle windshield, wherein said second durometer is less than said first durometer.

In a second embodiment the present invention is directed at a vehicle body ventilation system for a vehicle having a windshield, a hood, an air plenum, and a cowl assembly, wherein the cowl assembly comprises a cowl grille panel having a front and a rear edge and a first seal including a sealing portion for sealing against said air plenum and said hood and a carrier portion wherein said carrier portion is frictionally engaged with said front edge of said cowl grille panel. A second seal is provided including a sealing portion and a carrier portion wherein said carrier portion is frictionally engaged with said rear edge of said cowl grille panel, wherein the carrier portion of said first seal and said second seal is of a first durometer and said sealing portion of said first seal and said sealing portion of said second seal each are of a second durometer wherein said sealing portion of said first seal seals against a vehicle hood and air plenum and said sealing portion of said second seal seals against a vehicle windshield, wherein said second durometer is less than said first durometer.

In a third alternative embodiment the present invention is directed at a vehicle body ventilation system for a vehicle having a windshield, a hood, an air plenum, and a cowl assembly, wherein the cowl assembly comprises a cowl grille panel having a front and a rear edge and a first seal including a sealing portion for sealing against said hood and a carrier portion wherein said carrier portion is frictionally engaged with said front edge of said cowl grille panel and said air plenum. A second seal is provided including a sealing portion and a carrier portion wherein said carrier portion is frictionally engaged with said rear edge of said cowl grille panel, wherein the carrier portion of said first seal and said second seal is of a first durometer and said sealing portion of said first seal and said sealing portion of said second seal each are of a second durometer wherein said sealing portion of said first seal seals against a vehicle hood and said sealing portion of said second seal seals against a vehicle windshield, wherein said second durometer is less than said first durometer.

In a fourth alternative embodiment the present invention is directed at seals for sealing a cowl grille panel to a windshield and hood of a vehicle, said seals comprising a first seal including a sealing portion and a carrier portion wherein said carrier portion is frictionally engaged with said front edge of said cowl grille panel, and a second seal including a sealing portion and a carrier portion wherein said carrier portion is frictionally engaged with said rear edge of said cowl grille panel. The carrier portion of said first seal and said second seal is of a first durometer and said sealing portion of said first seal and said sealing portion of said second seal each are of a second durometer wherein said sealing portion of said first seal seals against a vehicle hood and said sealing portion of said second seal seals against a vehicle windshield, wherein said second durometer is less than said first durometer.

In a fifth alternative embodiment the present invention is directed at seals for sealing a cowl grille panel to a windshield, hood and air plenum of a vehicle, said seals comprising a first seal including a sealing portion for sealing against said air plenum and said hood and a carrier portion wherein said carrier portion is frictionally engaged with said front edge of said cowl grille panel and a second seal including a sealing portion and a carrier portion wherein said carrier portion is frictionally engaged with said rear edge of said cowl grille panel, wherein the carrier portion of said first seal and said second seal is of a first durometer and said sealing portion of said first seal and said sealing portion of said second seal each are of a second durometer wherein said sealing portion of said first seal seals against a vehicle hood and air plenum and said sealing portion of said second seal seals against a vehicle windshield, wherein said second durometer is less than said first durometer.

In a sixth alternative embodiment the present invention is directed at seals for sealing a cowl grille panel to a windshield, hood and air plenum of a vehicle, said seals comprising a first seal including a sealing portion for sealing against said hood and a carrier portion wherein said carrier portion is frictionally engaged with said front edge of said cowl grille panel and said air plenum, and a second seal including a sealing portion and a carrier portion wherein said carrier portion is frictionally engaged with said rear edge of said cowl grille panel, wherein the carrier portion of said first seal and said second seal is of a first durometer and said sealing portion of said first seal and said sealing portion of said second seal each are of a second durometer wherein said sealing portion of said first seal seals against a vehicle hood and said sealing portion of said second seal seals against a vehicle windshield, wherein said second durometer is less than said first durometer.

BRIEF DESCRIPTION OF THE INVENTION

In the appended drawings, common elements use the same numeric character but are distinguished by the addition of a letter to identify a common element between embodiments (for instance, 10, 10A, 10B, etc.

DETAILED DESCRIPTION OF THE PREFERRED EMBODIMENTS

As noted above, the present invention is directed to a cowl assembly for a vehicle which preferably includes snap-on seals at both the front and rear edges of a cowl grille panel to seal against the windshield, hood and plenum chamber thereby reducing noise, water and air leakage. The snap-on seals may be co-extruded profiles in a number of shapes, having a more rigid, preferably plastic, carrier portion and a softer, preferably elastomeric, lip or sealing portion. The seals are easily snapped over complementary features of the cowl grille edge and seal at the cowl grille panel rear edge against the lower surface of the vehicle windshield and at the cowl grille panel front edge against the vehicle hood. In alternate embodiments, the front seal may also seal against the vehicle plenum chamber. Alternatively, the front seal may comprise a carrier portion which overlaps and connects together the cowl grille panel and the front edge of the plenum chamber. The softer sealing portion may comprise a lip portion having an enhanced moment or may comprise a hollow bulb seal which can fill in larger gaps or spaces between adjacent compartments.

Figure 1:
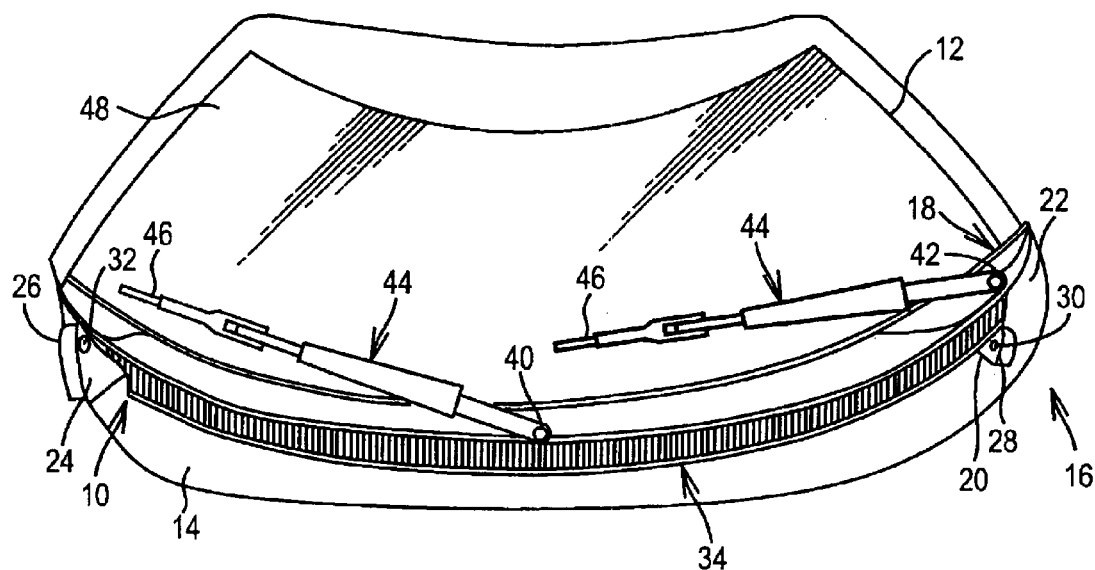
FIG. 1 is a fragmentary perspective view of a vehicle embodying the cowl assembly of the present invention.

Referring now to the drawings, FIG. 1 illustrates a vehicle cowl assembly 10 located between a windshield 12 and a hood 14 of a motor vehicle 16. The cowl assembly 10 carries a seal unit 18 that is configured to seal a gap between the cowl grille panel 34 and the windshield 12 above a fire wall 20. A pair of laterally spaced supports or connection points 22, 24 are provided on a vehicle part, e.g., the right and left vehicle fenders, for connection to opposite ends 26, 28 of the cowl assembly 10 by suitable fasteners such as plug nuts 30, 32 or other suitable fasteners depending upon the type selected by the manufacturer that is practicing the method of the present invention to apply the cowl assembly and seal unit of the present invention for its intended industrial application. The cowl grille panel 34 includes openings 40, 42 through which dual wiper arms 44 and blades 46 are reciprocally pivotally mounted on the cowl 34 for wiping the outer surface 48 of the windshield 12.

Figure 2:
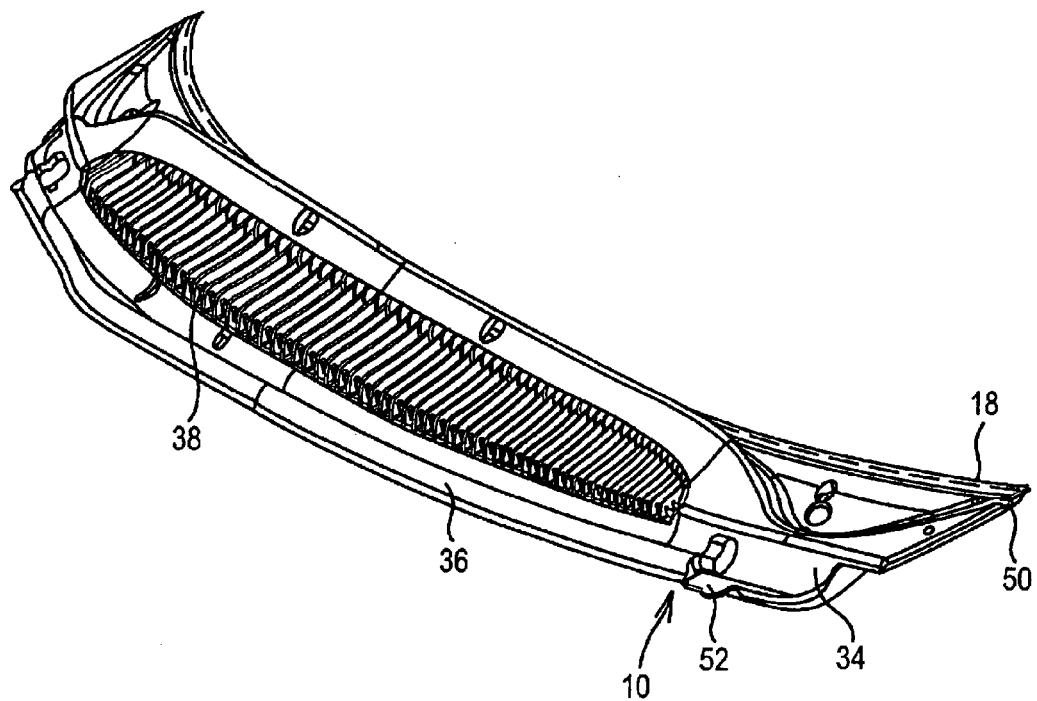
FIG. 2 is a perspective view of a cowl grille panel including the snap-on seals of the present invention.

As shown in FIG. 2, the cowl assembly 10 of the present invention includes a cowl grille panel 34 having an open grille area 38 for allowing air to enter a plenum for the HVAC unit (not shown) of the vehicle. The cowl grille panel 34 also includes two snap-on seals 18, 36 which mount on the rear and front edges 50, 52 respectively of the cowl grille panel 34. The rear edge seal 18 conforms to the surface of the windshield 12, while the front edge seal 36 conforms to the vehicle hood when it is in a closed position.

Figure 3:
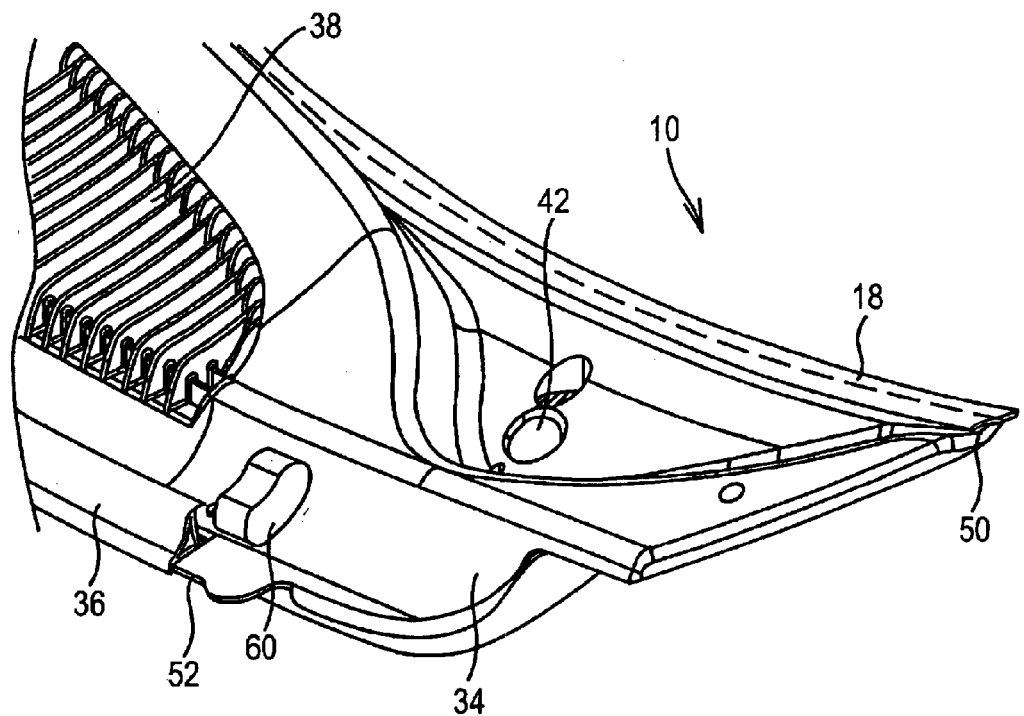
FIG. 3 is an enlarged view of the right end of the cowl grille panel of FIG. 2.

FIG. 3 is an enlarged view of the driver's side end of the cowl assembly 10, showing one embodiment of the profile shape of the preferably co-extruded plastic/elastomeric snap-on seals 18, 36. In this embodiment, the rear seal 18 is snapped over the rear edge 50 of the cowl grille panel 34. The front seal 36 of the cowl grille panel snaps over the front edge 52 of the grille cowl panel and is preferably a co-extruded profile of plastic/elastomer which has an upstanding hollow "shark fin" cross-section to seal against the vehicle hood. Also shown are the opening 42 through which the driver's side windshield wiper can be mounted and a sponge rubber pad 60 that the hood 14 compresses when the hood 14 is closed. The cowl grille panel 34 is preferably injection molded of a rigid thermoplastic including, but not limited to, polycarbonate/ABS, polyphenylene oxide, talc-filled polypropylene or acrylonitrile styrene acrylate.

Figure 4:
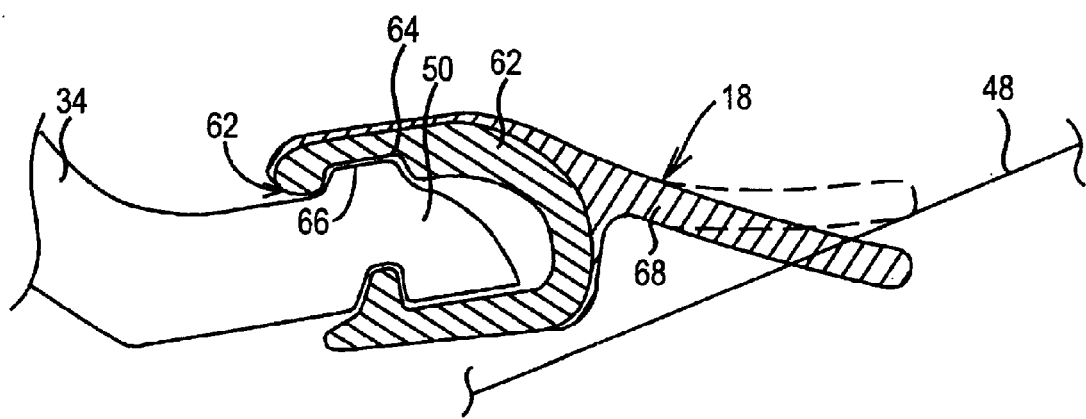
FIG. 4 is an enlarged cross-sectional view of one embodiment of the windshield seal of the present invention.

Turning to FIG. 4, one embodiment of the cowl grille panel rear snap-on seal 18 is shown in sectional view. The seal 18 is a preferably co-extruded profile comprising a carrier portion 62 and a lip portion 68. This generally U-shaped profile 62 is preferably a rigid thermoplastic, such as 20% talc-filled polypropylene, and has features on its inner surface 64 that are complementary in shape to the outer surface features 66 of the cowl grille panel rear edge 50.

With both the cowl grille panel 34 and carrier portion 62 of the seal 18 being rigid thermoplastic, by matching the features of the surfaces 64, 66, a die locked condition is created between the carrier portion 62 and cowl grille panel 34 which assures a secure attachment with high pull-off forces. The lip portion 68 of the seal 18 is preferably a thermoplastic rubber (TPR) which is softer (lower durometer) than the plastic carrier 62 and co-extruded or molded to the carrier portion 62 to form a composite structure having two ranges of hardness, a harder carrier portion 62 for retention to the cowl grille panel 34 and a softer lip portion 68 for sealing against the windshield surface 48.

In FIG. 4, the lip portion 68 of the seal 18 is shown in an as-molded condition (solid line) and in an assembled condition (dashed line) under compression with the windshield surface 48. It is noteworthy that as shown in FIG. 4 the cross-sectional area of the cowl grille panel 34 near its rear edge 50 is kept constant and not reduced to allow for the snap-fit of the seal carrier portion 62. This is important as this allows for a significant reduction in the clamp tonnage required for the injection molding machine that forms the cowl grille panel 34.

Figure 4A:
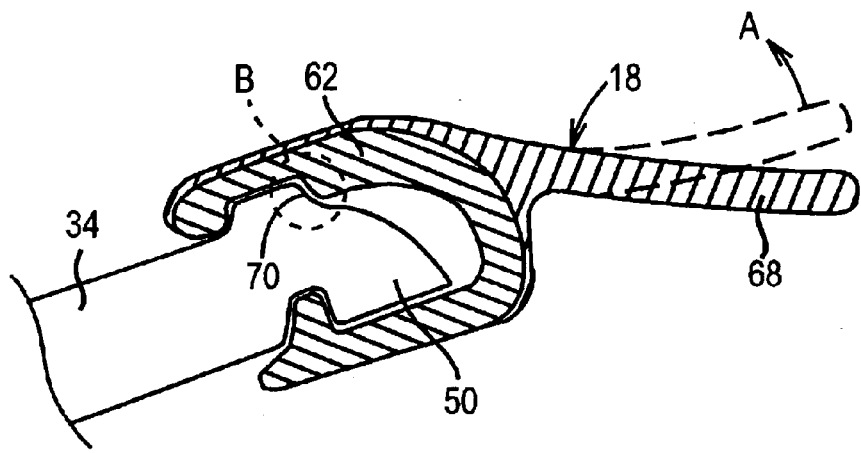
FIG. 4A is an enlarged cross-sectional view of an alternate embodiment of the windshield seal of FIG. 4.

FIG. 4A illustrates an improved condition over FIG. 4 in both seal retention and sealing. As can be seen in the circle indicated by arrow "B", the surfaces 64, 66 have been elongated to form essentially a die locked condition at 70 between the carrier portion 62 of the seal 18 and the rear edge 50 of the cowl grille panel 34. This provides additional retention of the seal 18 on the cowl grille panel 34 when the lip portion 68 of the seal 18 is rotated upward (direction of arrow A) as the lip portion 68 engages the windshield (not shown) and provides a greater moment for sealing against the windshield (note the angle of the lip portion with reference to the center line of the cowl grille panel 34).

Figure 4B:
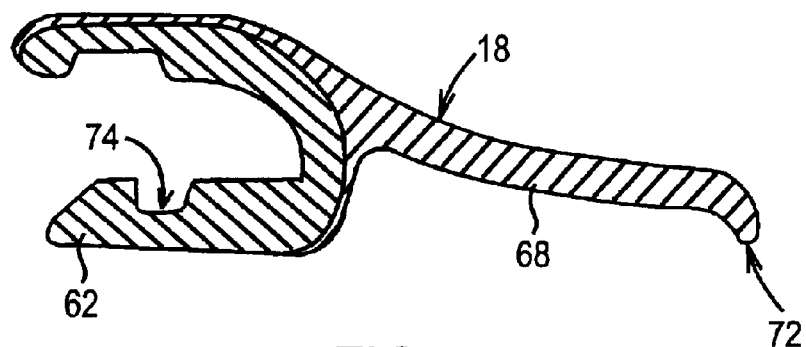
FIG. 4B is an enlarged cross-sectional view of an alternate embodiment of the windshield seal of FIG. 4.

FIG. 4B illustrates another alternate embodiment of the snap-on seal 18 which focuses the pressure for sealing the lip portion against the windshield as well as increased pull-off forces for the carrier portion. Here, a stabilizing bead 72 is formed at the tip of the lip portion 68 of the seal 18 which provides additional local pressure to conform the seal against the windshield and to stabilize the end of the seal 18 against movement at high vehicle speeds. In addition, an additional depression 74 is formed in the carrier portion 62 and matched against a complementary feature in the cowl grille panel 34 near its rear edge 50 to further lock (crosslock) the seal 18 on the cowl grille panel 34 rear edge 50 and increase pull off force.

Figure 5:
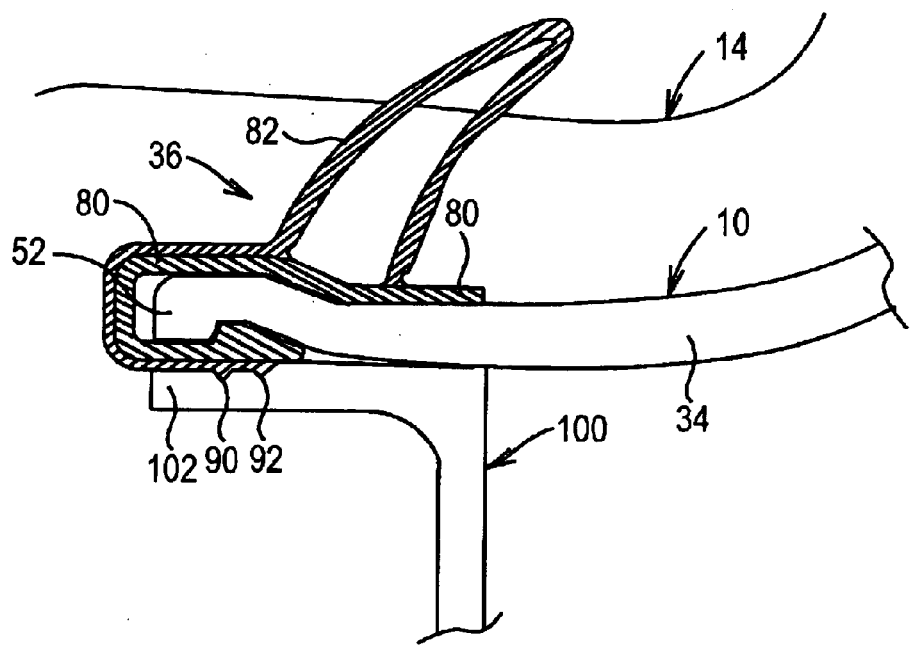
FIG. 5 is an enlarged cross-sectional view of one embodiment of the hood seal of the present invention.

Turning to the hood seal 36 which snaps over the front edge 52 of the cowl grille panel 34 to seal to the vehicle hood 14, FIG. 5 illustrates one embodiment of the present invention. The hood seal 36 is preferably a co-extrusion of a rigid plastic to form the U-shaped carrier section 80 which snaps over the front edge 52 and a softer seal portion 82. In this embodiment, the seal portion 82 is shaped like a shark's fin and is a bulb or hollow seal capable of sealing fairly large openings. In this FIG. 5, the hood 14 is shown by a line as if it were closed to illustrate the amount of interference with the seal portion 82. Being quite flexible, preferably of a thermoplastic rubber and hollow, the seal portion 82 prevents noise and fumes from escaping from the rear edge of the vehicle hood and entering the passenger compartment through the cowl grille panel openings and the plenum for the HVAC. Similarly, the seal prevents water from entering the engine compartment.

The carrier portion 80 of the hood seal 36 is formed of a more rigid plastic, as with the rear edge seal carrier portion 62 and has a U-shape with complementary features to those of the front edge 52 of the cowl grille panel 34 so that a snap-fit is created. In the embodiment shown in FIG. 5, a further feature of the hood seal 36 are protrusions 90, preferably triangular, which extend downward from the bottom of the seal 36 to engage with complementary grooves 92 in the front lip 102 of the plenum 100 to provide additional sealing. This eliminates an additional path for the leakage of fumes from the engine compartment into the passenger compartment of the vehicle. In this embodiment, the triangular protrusions 90 are solid and formed of the softer seal material, preferably thermoplastic or even thermoset rubber, during the extrusion or molding process that forms the hood seal 36.

Figure 5A:
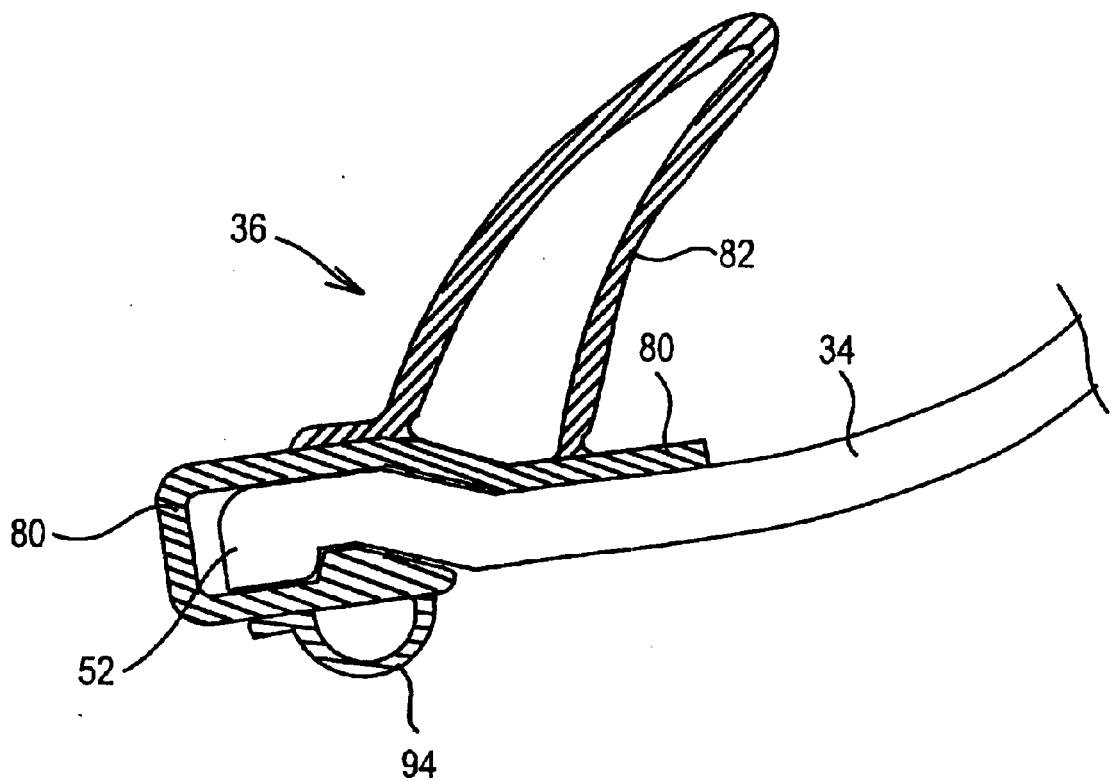
FIG. 5A is an enlarged cross-sectional view of an alternate embodiment of the hood seal of FIG. 5.

FIG. 5A shows an alternate embodiment of the hood seal 36 where the triangular protrusions 90 are replaced with a bulb seal 94 of preferably circular, semi-circular or elliptical cross-section, in this case semi-circular. This hollow seal portion 94 may be preferred to seal larger gaps between the front edge 52 of the cowl grille panel 34 and the lip 102 of the plenum 100 (see FIG. 5). While the hood seal 36 may be formed such that the softer, preferably thermoplastic rubber material, completely may cover the outer surface of the carrier portion 80 (as shown in FIG. 5), it is also possible to form the softer sealing material in two portions, a shark-fin bulb seal portion 82 and a plenum seal portion 94 (see FIG. 5A). This alternate construction provides material and cycle time efficiencies in the manufacturing process for the hood seal 36, reducing cost. It should be noted that with the hood seal 36 of the present invention, as with the rear edge seal 18, the cross-section of the cowl grille panel is kept constant at its front edge 52, essentially equal to the thickness of the body of the grille panel, to minimize the clamp tonnage required when forming the grille panel 34.

Figure 5B:
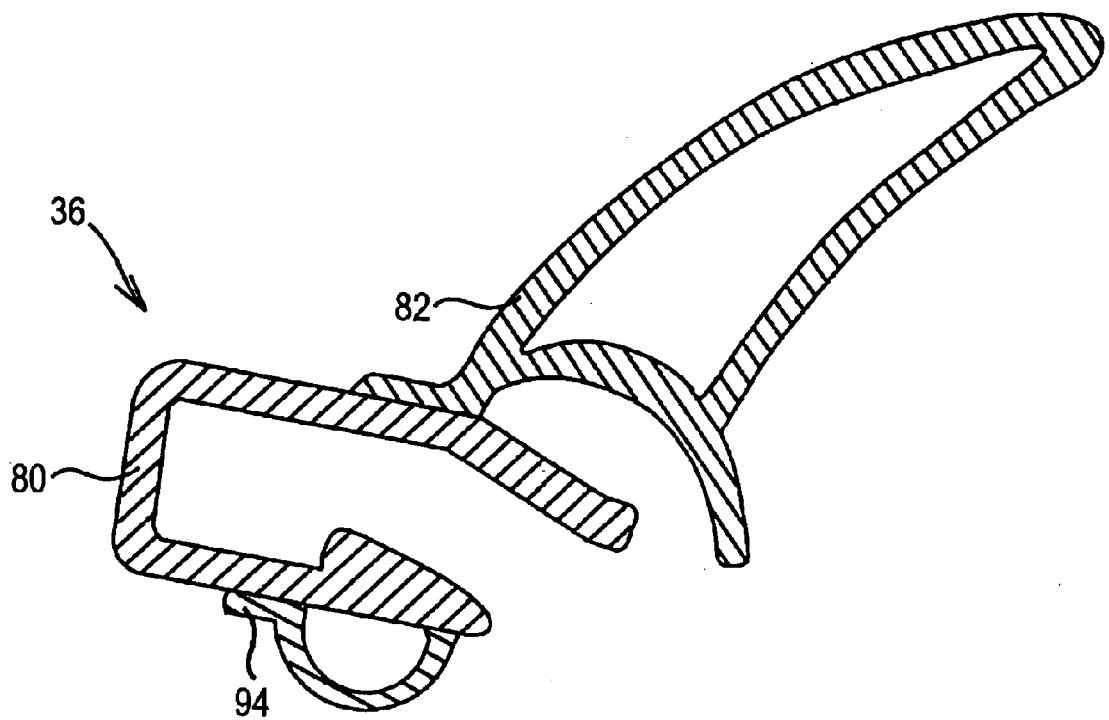
FIG. 5B is an enlarged cross-sectional view of an alternate embodiment of the hood seal of FIG. 5.

FIG. 5B illustrates a further example of this, as a still lower cost (less material required) hood seal is provided.

Figure 6:
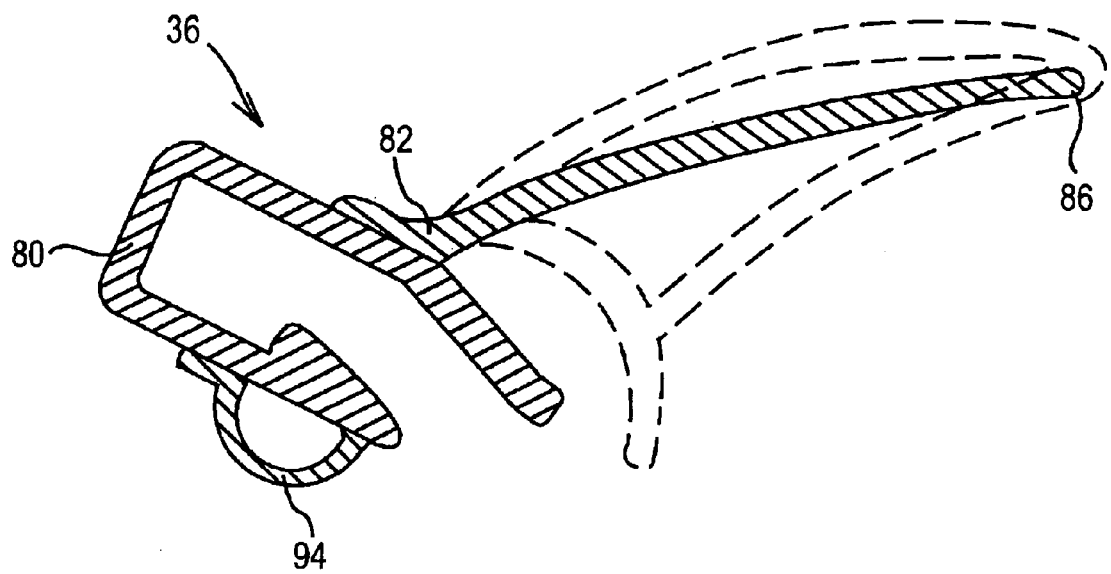
FIG. 6 is an enlarged cross-sectional view of an alternate embodiment of the hood seal of the present invention.

FIG. 6 illustrates an alternate embodiment of the hood seal 36 of the present invention which uses even less material. Here, the lip seal portion 82 is in the form of an extended beam member rather than the "shark fin" bulb portion of FIG. 5 (shown in dashed lines). As with the lip seal portion 68 of the rear seal 18 (see FIG. 4) the tip of the lip seal portion 86 (72 in FIG. 4B) may have a stabilizing bead to provide for some sweep variation in the hood undersurface that it seals against.

Figure 7:
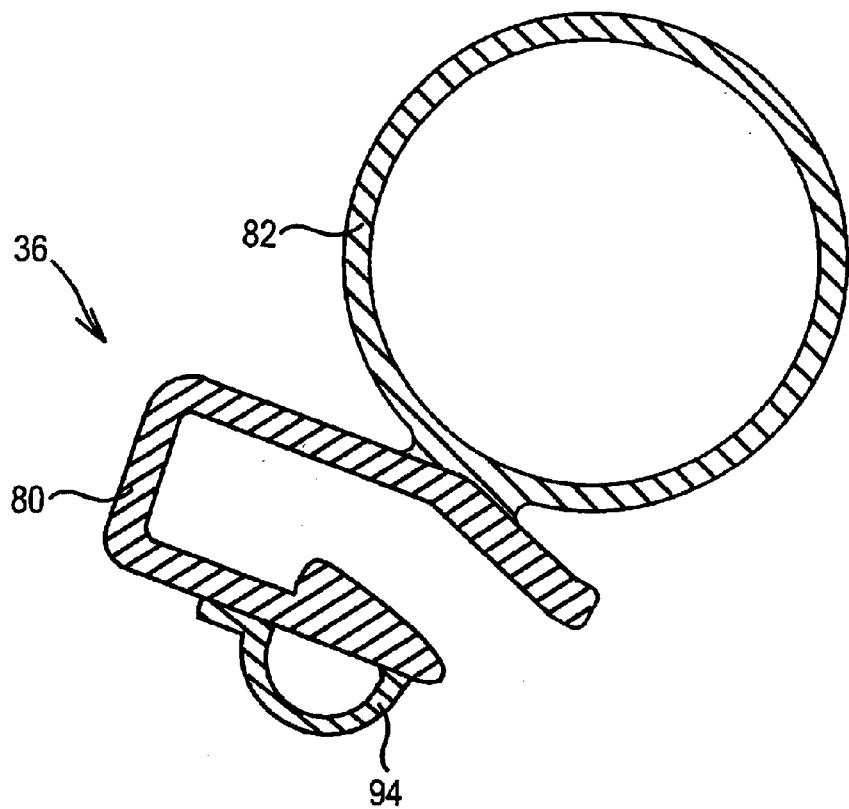
FIG. 7 is an enlarged cross-sectional view of an alternate embodiment of the hood seal of the present invention.

FIG. 7 illustrates an alternate embodiment of the hood seal 36 which includes the rigid plastic portion 80 and a softer plenum seal portion 84 but has a preferably round cross-section hollow bulb seal 82 to seal against the vehicle hood. This round hollow construction can accept even greater changes in surface contour of the opposing sealing surface. As with the aforementioned seal constructions, a co-extruded profile of talc-filled polypropylene and thermoplastic rubber is preferred in order that the opposing requirements (snap-fit with secure retention of the carrier portion and softer conforming surface of the seal portion) are embodied in a single-molding.

Figure 8:
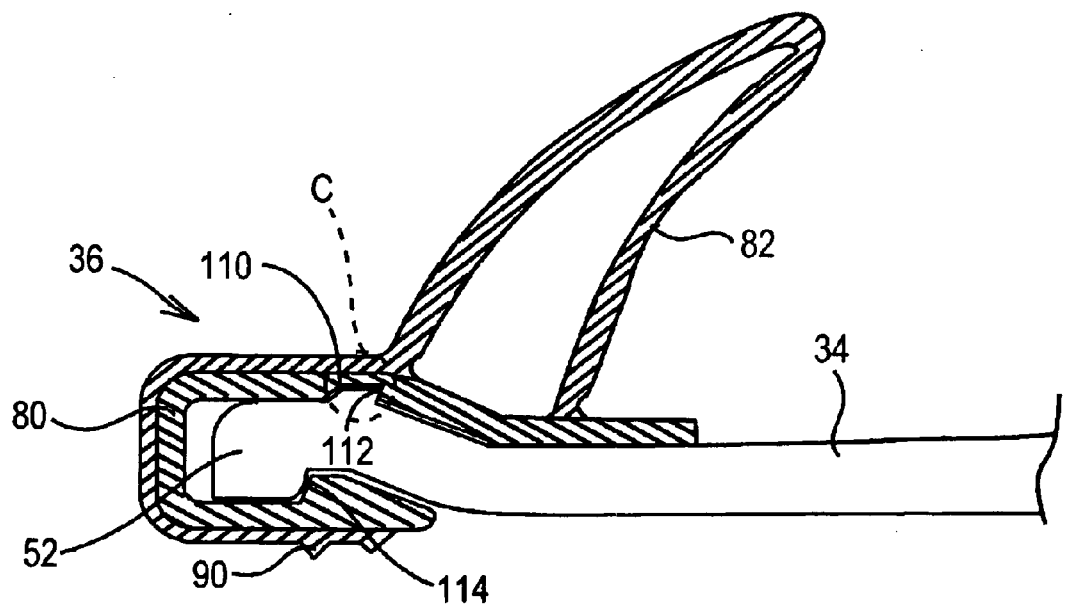
FIG. 8 is an enlarged cross-sectional view of an alternate embodiment of the hood seal of the present invention.

FIG. 8 describes an alternate locking mechanism for the hood seal 36 such that the retention forces against removal from the front edge 52 of the cowl grille panel 34 are increased. Similar to the cross-locking feature of the rear edge seal 18 to the windshield shown in FIG. 4A, this locking mechanism includes complementary features formed in the carrier portion 80 of the hood seal 36 and the front edge 52 of the cowl grille panel 34, as shown in the circle indicated by arrow C as 110 and 112 respectively, to dielock the seal 36 onto the cowl grille panel 34. This creates a cross-locking mechanism at 110, 112 vs. 114 to provide secure attachment for the seal on the grille panel front edge and is applicable to any of the embodiments of the present invention.

Figure 9:
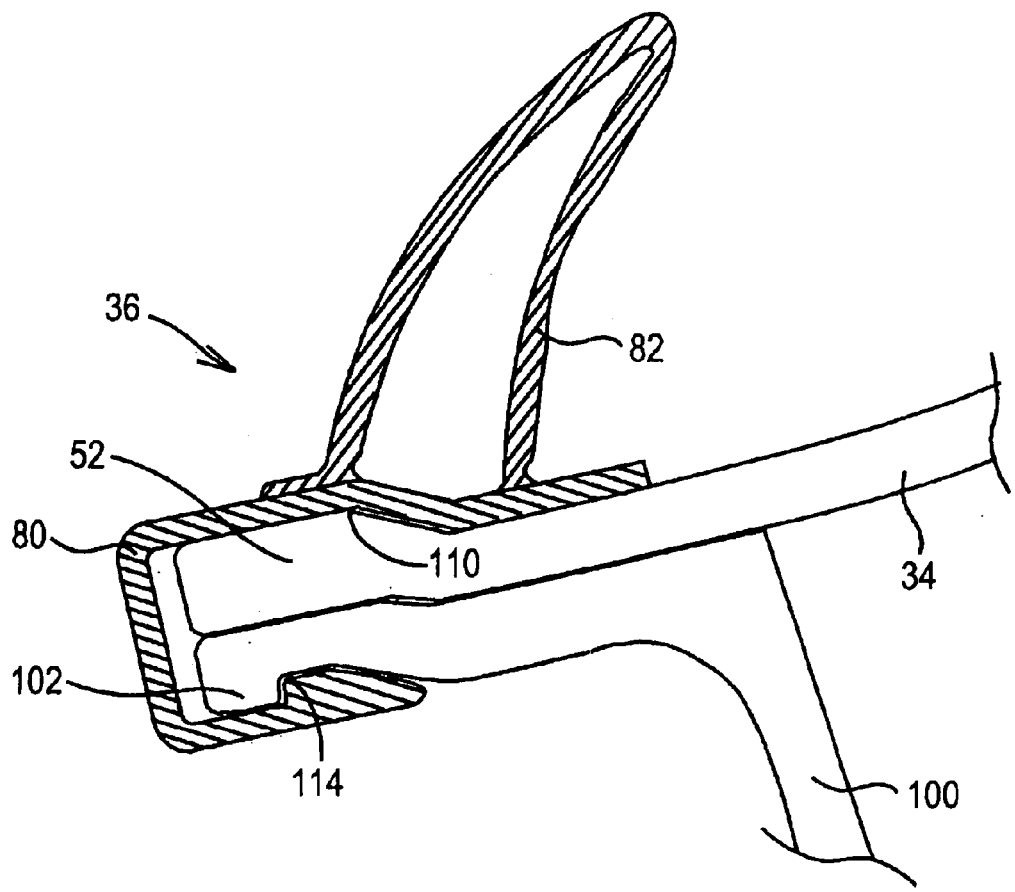
FIG. 9 is an enlarged cross-sectional view of the hood seal of the present invention in an alternate embodiment, capturing the plenum front edge.
Figure 10:
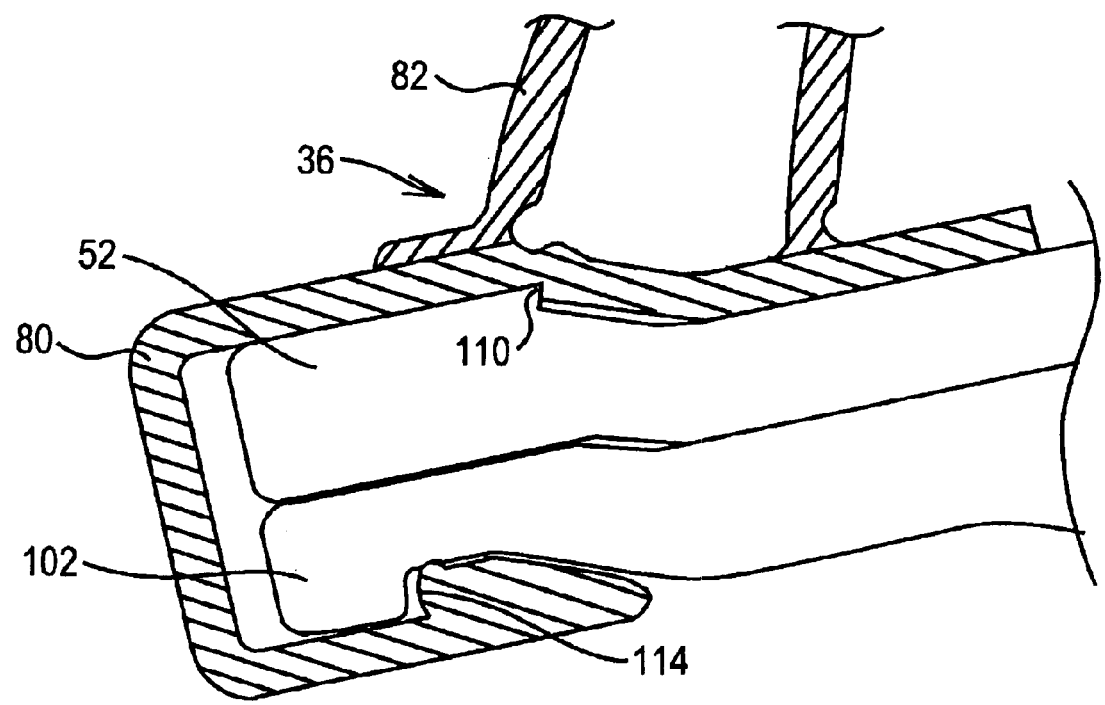
FIG. 10 is an enlarged cross-sectional view of the hood seal of the present invention in an alternate embodiment, capturing the plenum front edge.

As shown in FIG. 9, another alternate embodiment of the hood seal 36 uses the rigidity of the carrier portion 80 to snap-fit over both the front edge 52 of the cowl grille panel 34 and the front edge 102 of the plenum tub 100 to provide a seal for the interface of the cowl grille panel 34 and the tub 100 without requiring the soft internal seal 90 shown in FIG. 5. This provides an even less expensive and simpler sealing option. As with the hood seal 36 embodiment shown in FIG. 8, a cross-locking feature may be included at 114 and 110 (see FIG. 10) to securely locate and retain the hood seal 36 on the front edge of the cowl grille panel 34 and plenum 100.

It should also be apparent from the above written description and drawings that the invention provides a self-contained, easily assembled cowl assembly for a vehicle adaptable to a wide variety of windshield, hood and plenum configurations for sealing a cowl grille panel to prevent noise, air and water leakage. The cowl assembly can be a filler piece for closing the space between the windshield, hood and fenders of a vehicle. It may also be part of the HVAC system of the vehicle by including inlet opening 38 for the passage of air to the HVAC unit. The cowl assembly of the present invention includes seals for the front and rear edges of the cowl grille panel which have a carrier portion configured to snap in place and be securely retained, and a softer conformable sealing portion which can conform tightly to an opposing surface, such as a windshield, a closed hood or an air plenum. Of particular note, is that no additional attachment mechanism such as mechanical fasteners or double-backed adhesive tape are required with the seals of the present invention.

The specific features of any single embodiment shown in the appending FIGS. are applicable to any and all of the embodiments shown.

The description and drawings illustratively set forth the presently preferred invention embodiment. We intend the description and drawings to describe this embodiment and not to limit the scope of the invention. Obviously, it is possible to modify these embodiments while remaining within the scope of the following claims. Therefore, within the scope of the claims one may practice the invention otherwise than as the description and drawings specifically show and describe.

What is claimed is:

1. A vehicle body ventilation system for a vehicle having a windshield, a hood, and a cowl assembly, wherein the cowl assembly comprises:

a cowl grille panel having a front and a rear edge, a first seal including a sealing portion and a carrier portion wherein said carrier portion is frictionally engaged with said front edge of said cowl grille panel, and a second seal including a sealing portion and a carrier portion wherein said second seal carrier portion is frictionally engaged with said rear edge of said cowl grille panel, wherein the carrier portion of said first seal and said second seal is of a first durometer and said sealing portion of said first seal and said sealing portion of said second seal each are of a second durometer, wherein said sealing portion of said first seal seals against a vehicle hood and said sealing portion of said second seal seals against a vehicle windshield, wherein said second durometer is less than said first durometer.

2. The ventilation system of claim 1, wherein said first and second seals are formed by molding.

3. The ventilation system of claim 1, wherein said first and second seals are co-extruded.

4. The ventilation system of claim 1, wherein said sealing portion of said first seal is a hollow profile shape.

5. The ventilation system of claim 1, wherein said first and said second seals are retained on said front and said rear edges of said cowl grille panel by a cross locking feature formed by a die lock of said first seal carrier portion on said front edge and by said second seal carrier portion on said rear edge.

6. A vehicle body ventilation system for a vehicle having a windshield, a hood, an air plenum, and a cowl assembly, wherein the cowl assembly comprises:
a cowl grille panel having a front and a rear edge,
a first seal including a sealing portion for sealing against said air plenum and said hood and a carrier portion wherein said carrier portion is frictionally engaged with said front edge of said cowl grille panel,
a second seal including a sealing portion and a carrier portion wherein said second seal carrier portion is frictionally engaged with said rear edge of said cowl grille panel,
wherein the carrier portion of said first seal and said second seal is of a first durometer and said sealing portion of said first seal and said sealing portion of said second seal each are of a second durometer wherein said sealing portion of said first seal seals against a vehicle hood and air plenum and said sealing portion of said second seal seals against a vehicle windshield, wherein said second durometer is less than said first durometer.

7. The vehicle body ventilation system of claim 6 wherein said sealing portion of said first seal for sealing to said plenum comprises a hollow profile shape.

8. A vehicle body ventilation system for a vehicle having a windshield, a hood, an air plenum, and a cowl assembly, wherein the cowl assembly comprises:
a cowl grille panel having a front and a rear edge,
a first seal including a sealing portion for sealing against said hood and a carrier portion wherein said carrier portion is frictionally engaged with said front edge of said cowl grille panel and said air plenum,
a second seal including a sealing portion and a carrier portion wherein said second seal carrier portion is frictionally engaged with said rear edge of said cowl grille panel,
wherein the carrier portion of said first seal and said second seal is of a first durometer and said sealing portion of said first seal and said sealing portion of said second seal each are of a second durometer wherein said sealing portion of said first seal seals against a vehicle hood and said sealing portion of said second seal seals against a vehicle windshield, wherein said second durometer is less than said first durometer.

9. Seals for sealing a cowl grille panel to a windshield and hood of a vehicle, said seals comprising:
a first seal including a sealing portion and a carrier portion wherein said carrier portion is frictionally engaged with said front edge of said cowl grille panel, and
a second seal including a sealing portion and a carrier portion wherein said second seal carrier portion is frictionally engaged with rear edge of said cowl grille panel,
wherein the carrier portion of said first seal and said second seal is of a first durometer and said sealing portion of said first seal and said sealing portion of said second seal each are of a second durometer wherein said sealing portion of said first seal seals against a vehicle hood and said sealing portion of said second seal seals against a vehicle windshield, wherein said second durometer is less than said first durometer.

10. The seals of claim 9, wherein said first and second seals are formed by molding.

11. The seals of claim 9, wherein said first and second seals are co-extruded.

12. The seals of claim 9, wherein said seal portion of said first seal is a hollow profile shape.

13. The seals of claim 9, wherein said first and said second seals are retained on said front and said rear edges of said cowl grille panel by a cross locking feature formed by a die lock of said first seal carrier portion on said front edge and by said second seal said rear edge.

14. Seals for sealing a cowl grille panel to a windshield, hood and air plenum of a vehicle, said seals comprising
a first seal including a sealing portion for sealing against said air plenum and said hood and a carrier portion wherein said carrier portion is frictionally engaged with a front edge of said cowl grille panel,
a second seal including a sealing portion and a carrier portion wherein said second seal carrier portion is frictionally engaged with a rear edge of said cowl grille panel, wherein the carrier portion of said first seal and said second seal is of a first durometer and said sealing portion of said first seal and said sealing portion of said second seal each are of a second durometer wherein said sealing portion of said first seal seals against a vehicle hood and air plenum and said sealing portion of said second seal seals against a vehicle windshield, wherein said second durometer is less than said first durometer.

15. The seals of claim 14 wherein said sealing portion of said first seal for sealing to said plenum comprises a hollow profile shape.

16. A method of sealing a ventilation system for a vehicle having a cowl assembly, characterized by:
providing a cowl grille panel having a front and a rear edge,
providing a first seal including a sealing portion and a carrier portion wherein said carrier portion is frictionally engaged with said front edge of said cowl grille panel, and
providing a second seal including a sealing portion and a carrier portion wherein said second seal carrier portion is frictionally engaged with said rear edge of said cowl grille panel,
wherein the carrier portion of said first seal and said second seal is of a first durometer and said sealing portion of said first seal and said sealing portion of said second seal each are of a second durometer wherein said sealing portion of said first seal seals against a vehicle hood and said sealing portion of said second seal seals against a vehicle windshield, wherein said second durometer is less than said first durometer.

17. Seals for sealing a cowl grille panel to a windshield, hood and air plenum of a vehicle, said seals comprising
a first seal including a sealing portion for sealing against said hood and a carrier portion wherein said carrier portion is frictionally engaged with said front edge of said cowl grille panel and said air plenum,
a second seal including a sealing portion and a carrier portion wherein said second seal carrier portion is frictionally engaged with said rear edge of said cowl grille panel, wherein the carrier portion of said first seal and said second seal is of a first durometer and said sealing portion of said first seal and said sealing portion of said second seal each are of a second durometer, wherein said sealing portion of said first seal seals against a vehicle hood and said sealing portion of said second seal seals against a vehicle windshield, wherein said second durometer is less than said first durometer.

* * * * *